Patented Feb. 3, 1953

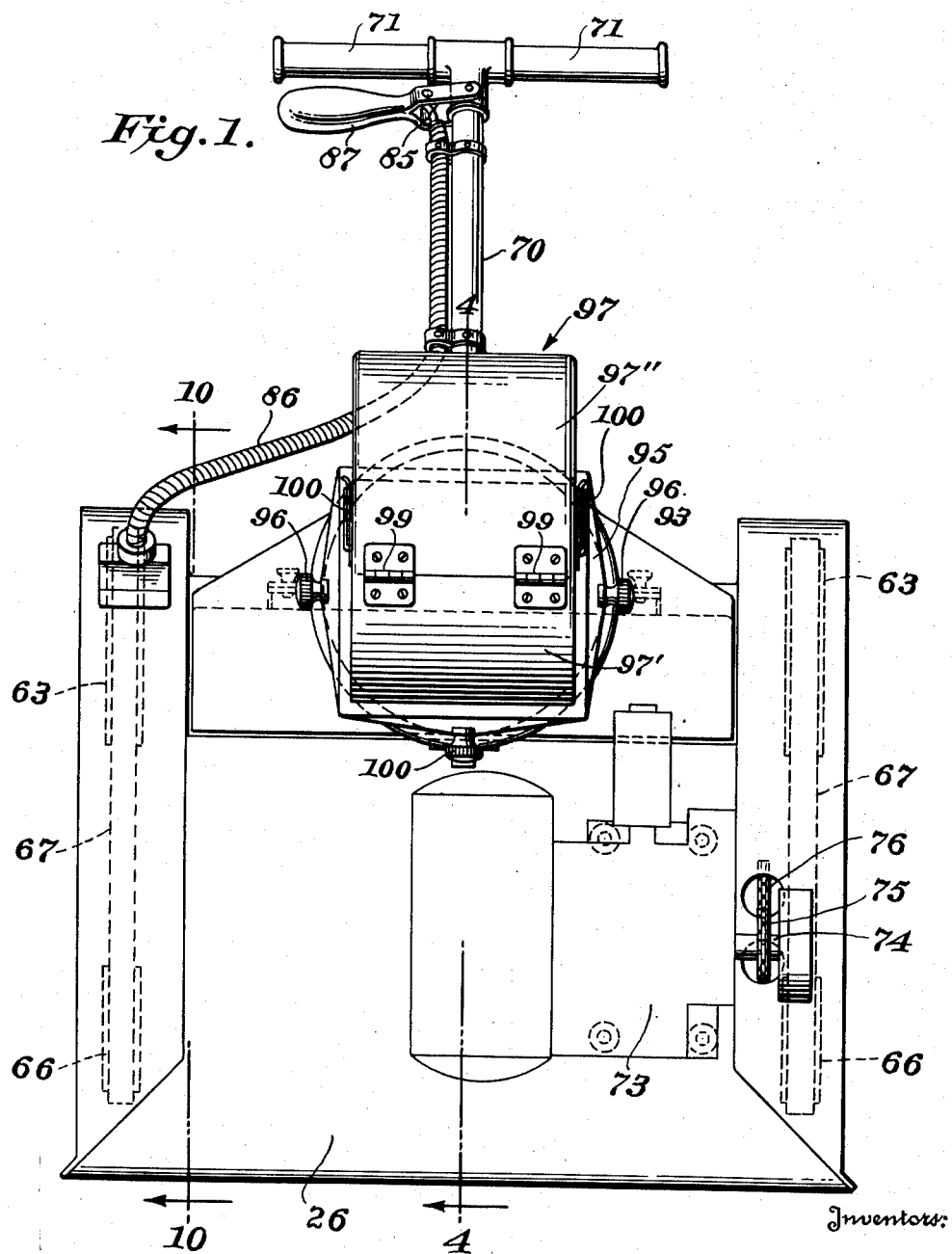

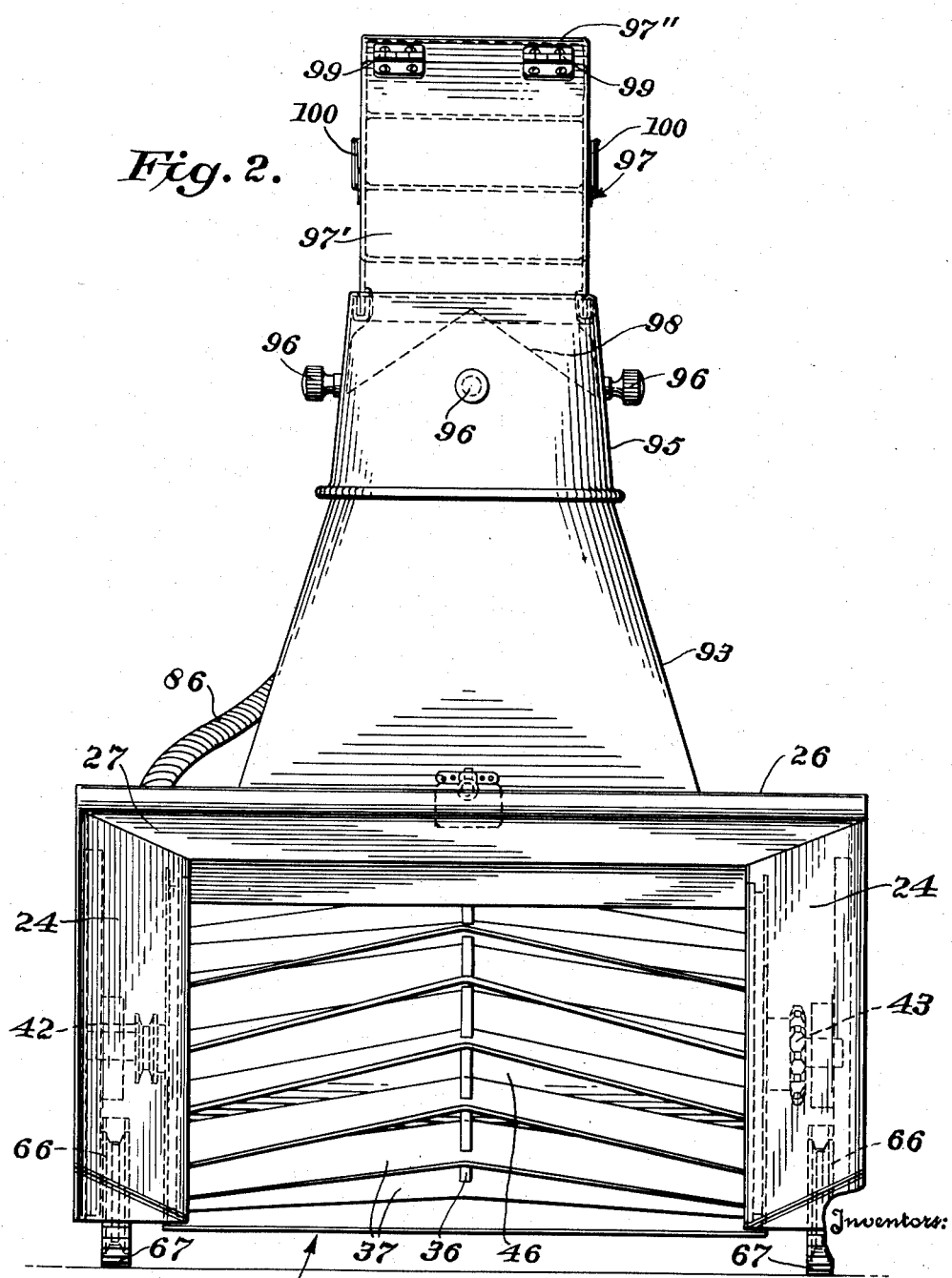

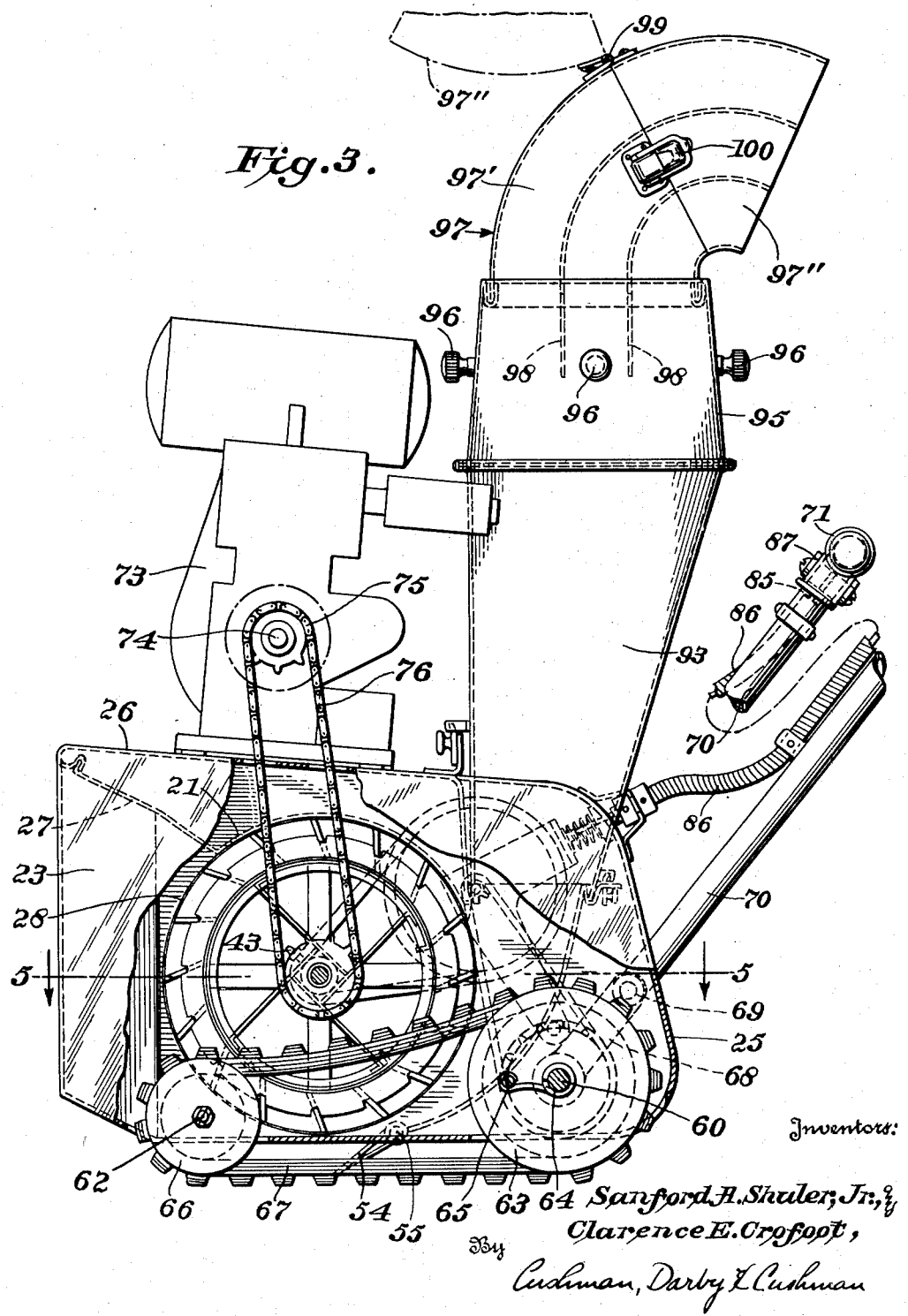

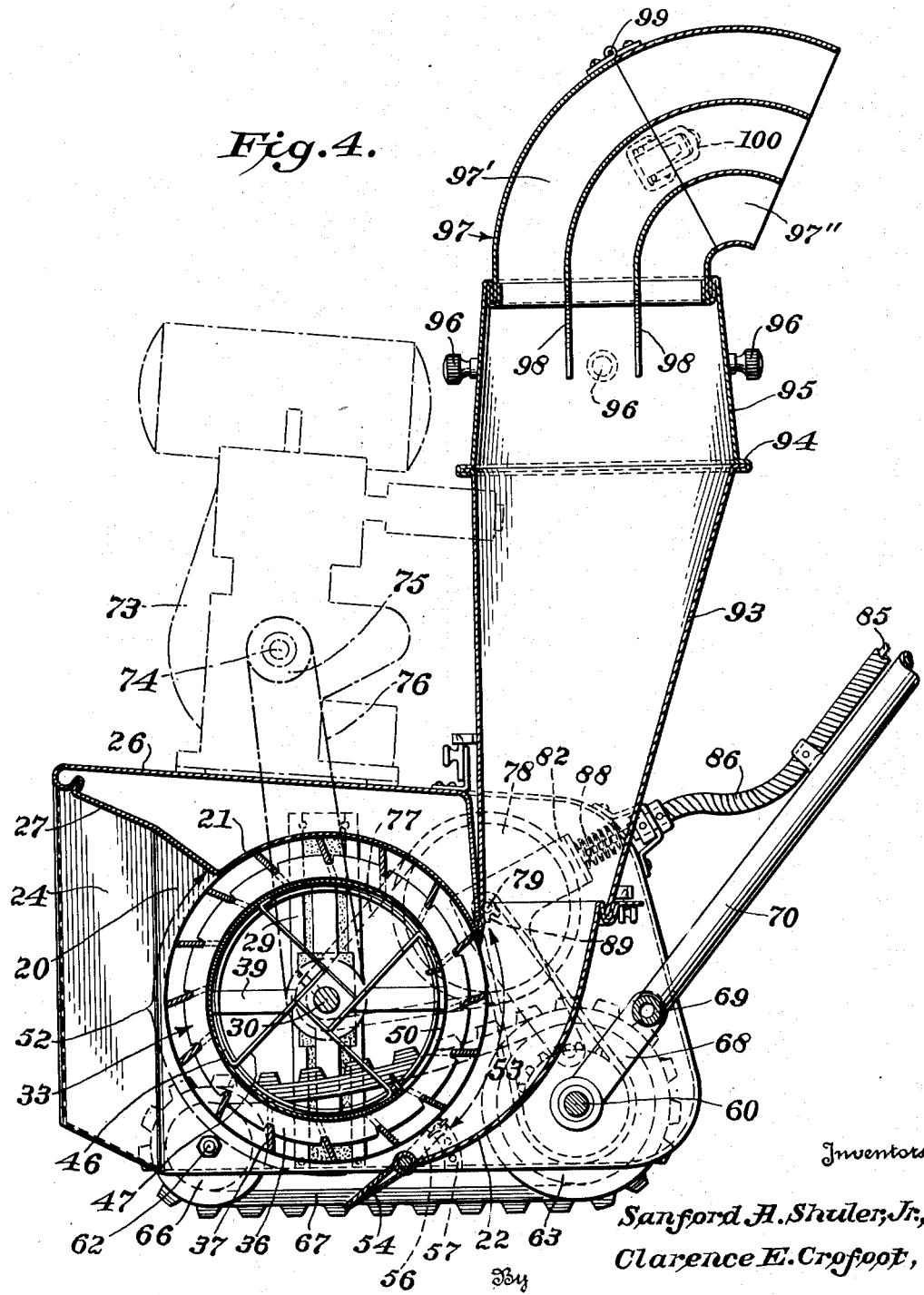

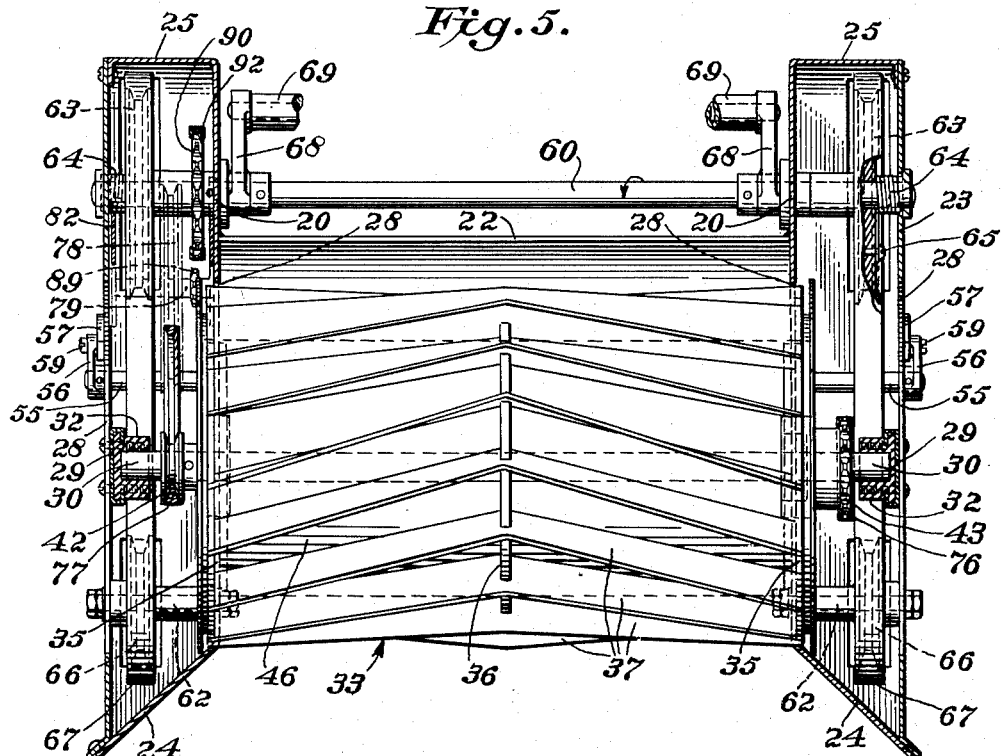
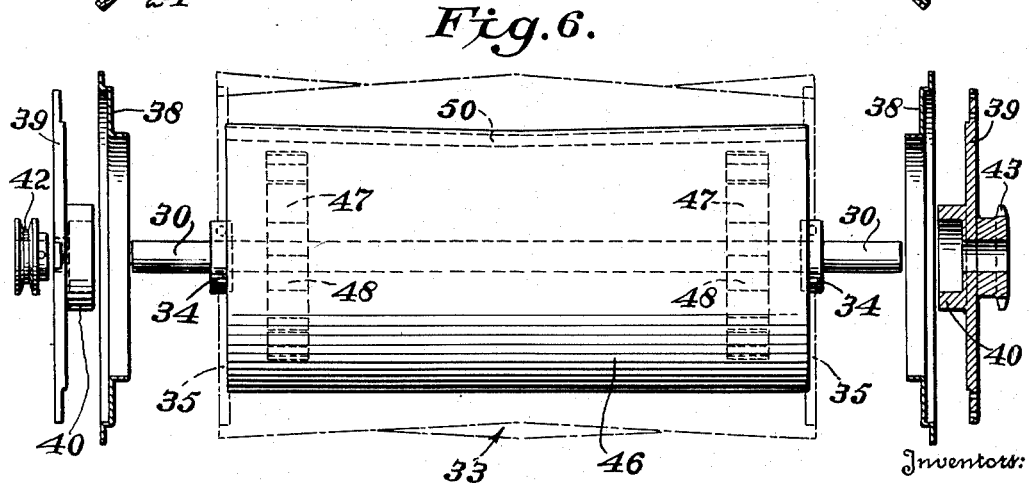

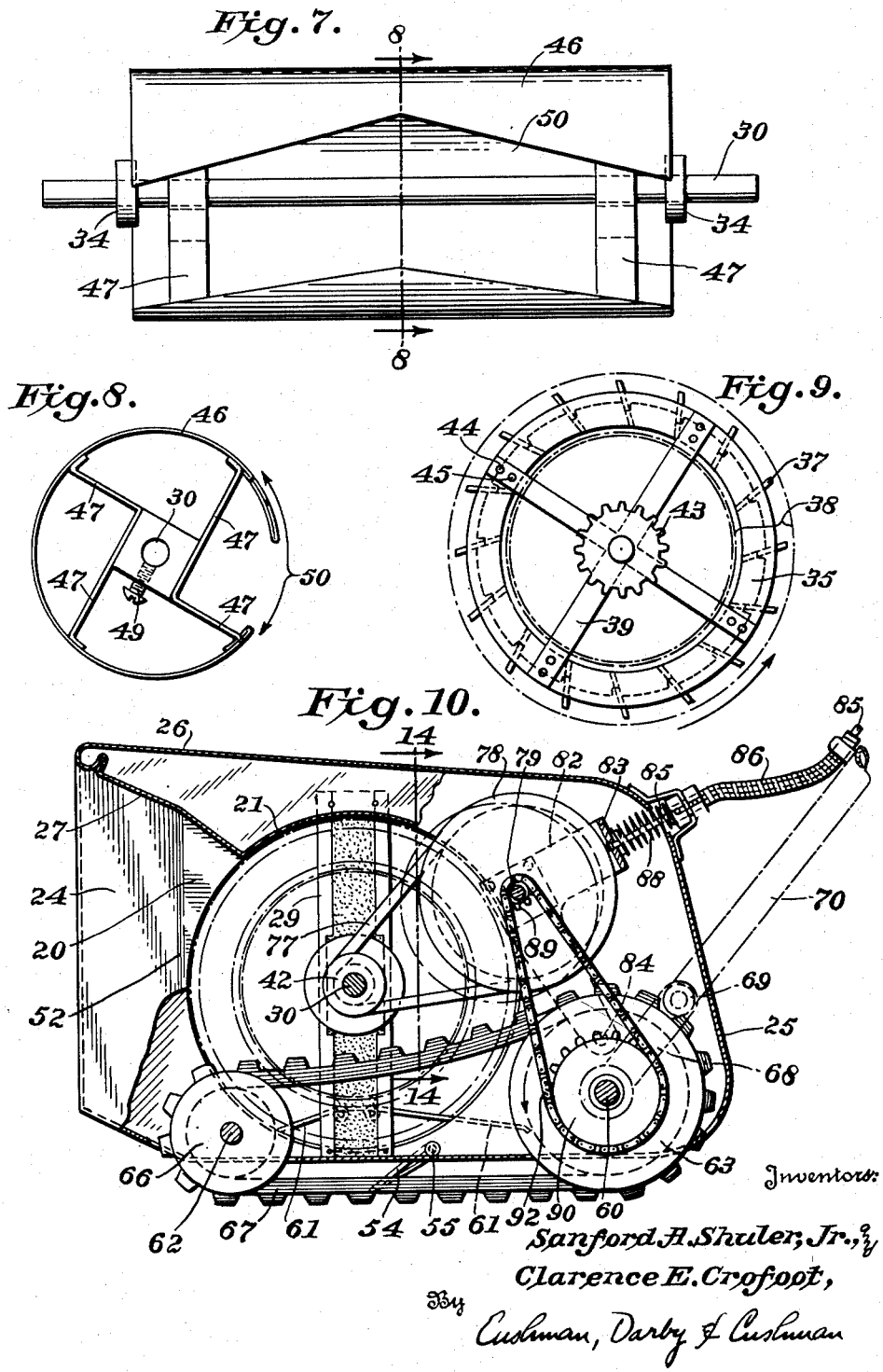

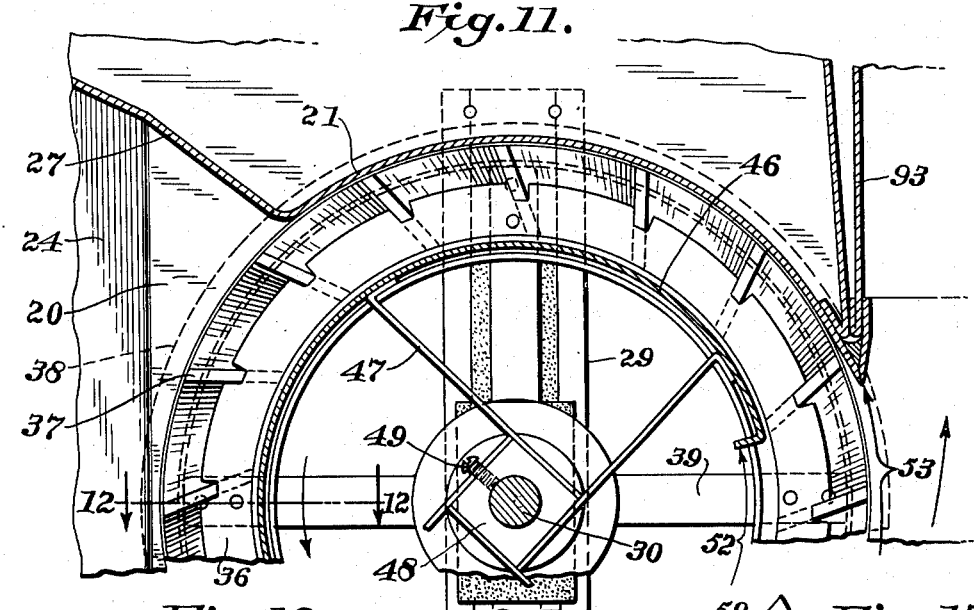
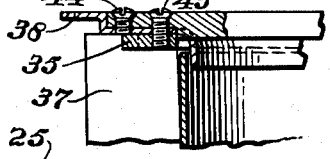
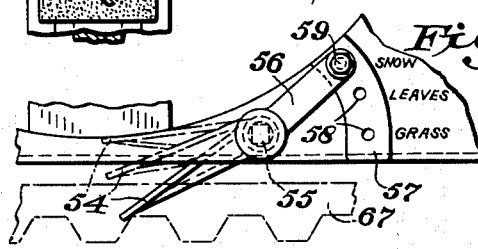
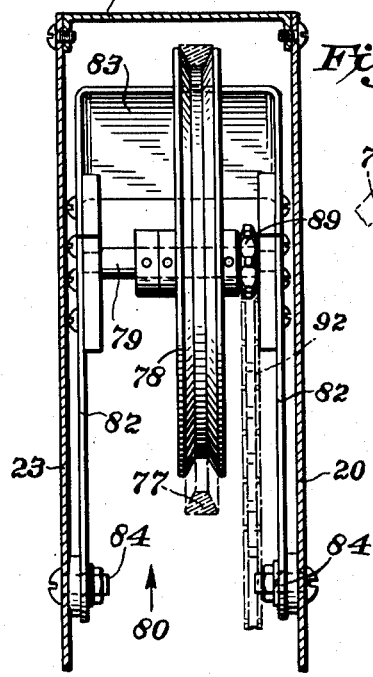
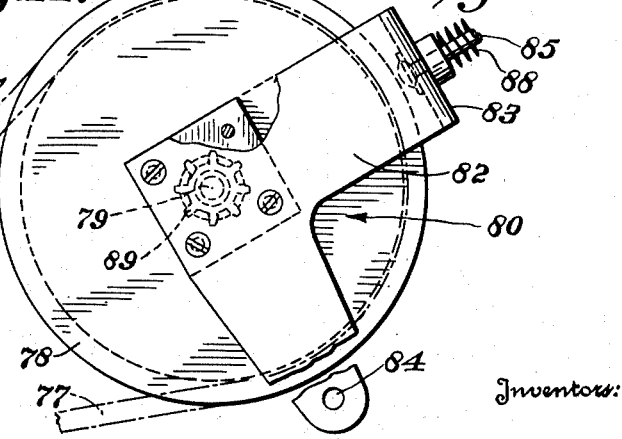

2,627,155

UNITED STATES PATENT OFFICE 2,627,155

APPARATUS ADAPTED FOR THE REMOVAL OF LEAVES AND GRASS AND THE LIKE

Sanford A. Shuler, Jr., and Clarence E. Crofoot, Schenectady, N. Y.

Application April 1, 1949, Serial No. 84,914

11 Claims. (Cl. 55—118)

1

This invention relates to material handling apparatus, and more particularly to power driven apparatus for the collection and displacement of snow, grass and the like.

It is an object of the present invention to provide a simplified yet highly efficient material handling apparatus of novel construction and design.

It is a further object of this invention to provide an apparatus adapted to pick up and collect dispersed material, and entrain and direct such material in a controlled manner.

A further object is to provide an apparatus adapted to pick up and displace material in a controlled manner with but a single handling of such material.

Still another object is to provide an apparatus adapted to collect, entrain and direct material, in which the path of material flow is continuous and smooth, without abrupt change of direction.

Another object is to provide an apparatus adapted to pick up and entrain particulate material from storage bins or the like, and to direct such material in a controlled manner to loading or packaging facilities.

Yet another object is to provide an apparatus adapted to cut or comminute material, and collect and direct the comminuted material by means of a controlled fluid stream.

Another object is to provide an apparatus adapted to remove and collect or redistribute snow, grass, leaves and the like, with or without comminution thereof.

Still another object is to provide an apparatus adapted for the spreading or dispersal of seed, fertilizer, insecticides and the like.

Other objects will be in part obvious and in part pointed out hereinafter.

The invention and the novel features thereof may best be understood by reference to the following description and the accompanying drawings, in which:

Figure 1 is a plan view of a preferred embodiment of the instant invention, mounted and arranged for employment for the removal of snow, grass, leaves and the like;

Figure 2 is a front elevation of the apparatus of Figure 1, with certain parts omitted for clarity and with parts partly broken away;

Figure 3 is a side elevation of the appartus of Figure 1, with the outer side plate partially broken away;

Figure 4 is a central vertical section taken on the line 4—4 of Figure 1;

Figure 5 is a sectional plan view taken substantially on the line 5—5 of Figure 3;

2

Figure 6 is an exploded view of the pump mounting and driving elements;

Figure 7 is an elevation of the pump baffle;

Figure 8 is a section on the line 8—8 of Figure 7;

Figure 9 is an end elevation of the centrifugal pump of the apparatus of Figure 1;

Figure 10 is a transverse sectional view, partly broken away, taken substantially on the line 10—10 of Figure 1;

Figure 11 is an enlarged fragmental sectional view corresponding substantially to Figure 4;

Figure 12 is a fragmental section taken on the line 12—12 of Figure 11;

Figure 13 is an enlarged fragmental view of means for adjusting the setting of the casing blade;

Figure 14 is an enlarged elevational view taken on the line 14—14 of Figure 10, and Figure 15 is an enlarged side elevation, partly broken away, of the clutch mechanism shown in Figure 14.

Referring to the drawings, the apparatus comprises a casing formed by the inner side plates 20, inner top plate 21 and bottom plate 22. The casing further comprises the outer side plates 23, which, with the inwardly sloping guide plates 24 and the rear plates 25, house and guard the supporting and driving mechanism for the apparatus, and the outer top plate 26, joined to inner top plate 21 at the front end thereof by the downwardly sloping top guide plate 27. The casing is desirably, though not necessarily, constructed of steel sheets of adequate guage to provide requisite strength and rigidity to the apparatus.

Each of the side plates 20 and 23 is provided with a central opening 28. The central openings 28 of the outer side plates 23 are bridged by the vertical bars 29, suitably affixed thereto, between which is rigidly mounted the transverse shaft 30, suitably journalled in the bearing caps 32 mounted on the bars 29, as may be best seen in Figure 5. The centrifugal pump or blower wheel, indicated generally as 33, is rotatably mounted upon the shaft 30 by means of the ball bearings 34 in place thereon. The blower wheel 33 comprises the end rings 35 and the central ring 36, by means of which a plurality of transverse vanes 37 are supported. The vanes 37 are desirably inclined relative to the axial direction, and may be of herringbone or V configuration, positioned to rotate with the apices thereof trailing, and comprise two vane sections joined at the central ring 36 and each inclined relative to the axial direction at a suitable angle, 20° having been found satisfactory. The vanes desirably are also forwardly inclined from the radial direction for cutting efficiency, an angle of substantially 20° satisfactorily effecting this result. The configuration of the vanes is best shown in Figures 2, 5, and 9.

The blower wheel 33, together with the seal plates 38 and support spiders 39, constitute a blower wheel assembly. The support spiders 39 comprise the inwardly extending hubs 40, adapted to enclose the bearings 34 in bearing relationship. Fixed to one of the support spiders is the pulley 42, and integrally incorporated in the other of said support spiders and extending outwardly therefrom is the sprocket 43. The blower wheel assembly elements are clearly shown in Figure 6, and the manner of their assembly to end rings 35 of the blower wheel 33 is best shown in Figures 9 and 12, wherein it will be seen that the seal plates 38 are joined to the arms of the support spiders by the screws 44, and the seal plates 38 and the support spiders 39 are joined to the end rings 35 of the blower wheel by the screws 45. The blower wheel assembly, comprising the aforementioned elements, constitutes a unitary structure freely rotatable upon the bearings 34.

Supported within the blower wheel 33 and desirably in close proximity to the inner edges of the vanes 37 thereof is the generally cylindrical baffle plate 46, which is substantially coextensive in length with the blower wheel 33. Baffle plate 46 is supported by the arms 47 extending from the collars 48, rigidly mounted on shaft 30, as by the set screws 49 (Figure 8). Baffle plate 46 incorporates the longitudinal V-shaped opening 50, desirably extending the entire length of the baffle plate, and disposed to correspond in direction to that of the blower wheel vanes.

The front of the casing, specifically the trailing edge of inner top plate 21, inner side plates 20, and the leading edge of bottom plate 22, defines the inlet opening 52. Bottom plate 22, inner side plates 20, and the leading edge of inner top plate 21 define the exhaust opening 53, radially displaced from inlet opening 52. The bottom plate 22, in the embodiment shown, merges smoothly into the exhaust opening 53, but may, if desired, follow generally the contour of blower wheel 33 for a distance, and then be joined to a more sharply defined exhaust opening. The casing blade 54 may be pivotally mounted at the leading edge of bottom plate 22, generally disposed in the forward direction, whereby its outer edge constitutes not only an extension of the leading edge of the bottom plate, but also the trailing edge of the inlet opening 52. The casing blade 54 is substantially coextensive in length with blower wheel 33 and is supported by means of the end pins 55 extending through and journalled in the outer side plates 23. Outside the outer side plates, the arms 56 are fixed to and extend from the end pins 55. Lugs 57, welded or otherwise suitably attached to the outer surfaces of the outer side plates, incorporate the threaded positioning holes 58, by means of which and the bolts 59, the arms may be adjustably fixed in a variety of angular positions relative to the casing, whereby the spacing and angular disposition of the casing blade 54 relative to the blower wheel may be selectively adjusted, for reasons presently apparent. The adjustment means for the casing blade are clearly shown in Figure 13.

The apparatus is mounted and supported by means of the transversely extending rear axle 60, and the coaxial front axle sections 62. The inner and outer side plates on either side, together with the inwardly sloping guide plates 24 and the rear plates 25, constitute a housing for the supporting and driving mechanism of the apparatus. This housing not only protects the supporting and driving mechanism from the introduction thereinto of the material being worked upon, but also serves as a guard to obviate the entanglement of loose clothing and the like therein. Within these housings, a rear wheel 63 is mounted adjacent each end of the rear axle 60, and engaged thereto in free wheeling relationship by a clutch spring 64, one end of which extends and is fixed to the rear wheel as by the screw 65 (see Figure 5). Also within these housings a front wheel 66 is freely rotatably mounted on each of the front axle sections 62. The wheels 63 and 66 may conveniently be in the form of pulleys, as shown, and joined in driving relationship by the cleated endless belts 67, by means of which the apparatus is supported and propelled. The cleated endless belts 67 have been found to be particularly suitable for use on uneven surfaces, such as snow or grass-covered areas. Obviously, the endless belts 67 may be replaced by rubber-tired wheels or any other suitable supporting devices. When pulleys are employed, suitably mounted scraper blades 61 may be provided to prevent accumulation within the V of the pulleys of snow, grass or other material. The scraper blades may be mounted in any convenient fashion, as on the vertical bars 29, as shown in Figure 10.

Inside the inner side plates 20, the arms 68 project rearwardly and upwardly from the rear axle 60, supporting between them the crossbar 69. The handle 70 extends rearwardly and upwardly from crossbar 69, and by means of the hand grips 71 at the outer end thereof the apparatus may be manually guided and driven.

The machine may be operated by any motive power means, as well as by hand, and in the embodiment shown is provided with the conventional gasoline engine 73, conveniently mounted on the outer top plate 26 of the casing. Power take off from the engine 73 is provided by the shaft 74 and the driving sprocket 75 fixed thereto. Driving sprocket 75 is connected to the sprocket 43 of the blower wheel assembly in driving relationship by the chain 76. The rotary motion of the blower wheel assembly is transmitted by means of its pulley 42 and the belt 77 to the clutch pulley 78, rotatably mounted on shaft 79 of the clutch housing, indicated generally as 80. The clutch housing 80, best shown in Figures 10, 14 and 15, comprises two generally L-shaped side portions 82, joined at the ends of one leg thereof by the transverse section 83. The housing is pivotally mounted to the inner and outer side plates of the casing adjacent the ends of the other legs of said side portions, as by the bolts 84. In this manner, it will be seen, the clutch housing is freely pivotal relative to the casing side plates above the bolts 84. The flexible pull wire 85 is fixed to the transverse section 83 of the clutch housing, and extends through the casing, guided and enclosed by the flexible conduit 86, to the operating handle 87, conveniently mounted adjacent one of the hand grips 71 of handle 70. Displacement of the operating lever 87 toward the hand grip 71, it will be understood, effects displacement of the pull wire 85 and corresponding pivotal movement of the clutch housing in a direction generally away from the transverse shaft 30. A return spring 88 encloses the pull wire 85 between transverse section 83 and the casing, whereby the clutch housing is urged in the general direction of shaft 30.

Also rotatably mounted on the clutch shaft 79 and fixed to the clutch pulley 78 is the sprocket 89 which is linked in driving relationship to the sprocket 90, suitably pinned to the rear axle 60, by the chain 92.

Extending generally upwardly from the exhaust opening 53 is the exhaust duct 93, merging from rectangular cross section at the lower end thereof into circular cross-sectional shape at the upper end thereof. Exhaust duct 93 at its upper end is formed into the outstanding lip 94, by means of which the intermediate section 95 is engaged and rotatably supported thereon. The intermediate section 95 is formed to merge from circular cross-sectional shape at its lower end to substantially square cross section at its upper end, and is provided with a plurality of the outstanding knobs 96, by which it may be axially rotated relative to the exhaust duct 93. A duct elbow 97 is suitably secured to the upper end of intermediate section 95, and is provided with a plurality of internal directional vanes 98, adapted to effect and maintain uniform fluid distribution over the cross section of the duct elbow. The lower end portions of the internal directional vanes 98 extend downwardly into intermediate section 95, and are of V or fishtail configuration, as shown in dotted lines in Figure 2. The duct elbow 97 is desirably composed of two parts, the inner elbow section 97' fixed to the top of intermediate section 95, and the outer elbow section 97'' hingedly secured to the upper edge of the inner section, as by hinges 99. Suitable latches 100 are provided on the elbow section sides to secure the sections in end to end relationship, when desired.

The operation of the apparatus will now be described in detail. The embodiment illustrated is particularly constructed and adapted for the removal of snow, leaves and grass. For these purposes, for example, a blower wheel of 11 inches outer diameter, 8.25 inches inner diameter and 18 inches length has been found to be suitable. In utilizing the apparatus for the removal of snow, the casing blade 54 is first adjusted and fixed in position so that its outer end diverges widely from the blower wheel vanes and clears the ground by only a small distance. This adjustment is simply accomplished by aligning the arms 56 with the uppermost of the holes 58, and locking the arms in that position by means of the bolts 59. The source of motive power is then energized, as by starting the engine 73, and the speed thereof adjusted to turn the blower wheel at approximately 2,000 revolutions per minute. This speed of revolution, as related to a blower wheel of the dimensions above set forth by way of example, effects a vane tip speed of approximately ninety-six feet per second, which has been found to be entirely satisfactory for the removal of snow. The high vane tip speed results in a comminuting or cutting action on the snow being worked upon, thereby obviating the possibility of large chunks of snow or ice being taken into the apparatus, with danger of resultant damage thereto. The cutting or slicing action of the blower wheel also tends to avoid the possibility of clogging, as the effect thereof is to separate the material into slivers or filaments of snow cushioned by intervening layers of air. The device is equally suitable for operation upon wet or dry material, without clogging or other impairment of functioning. It will be obvious that the blower wheel dimensions and rotational speed above set forth by way of example are not critical, but may be altered as desired within a very wide range.

With the blower wheel 33 directly operated by the engine 73, the machine may be guided and propelled into operating position by means of the handle 70. The inwardly sloping guide plates 24 and the downwardly sloping guide plate 27 function to guide the snow into the inlet opening 52 of the device as the machine moves forward. The device may now be propelled into the snow along the chosen path manually by means of the handle 70, or, through the medium of the clutch device, the apparatus may be propelled by the engine 73. This is accomplished, in the embodiment shown, by moving the operating lever 87 inwardly toward the hand grip 71, by means of which pull wire 85 is displaced and the clutch housing 80 pivoted away from the shaft 30, against the restraining action of return spring 88. This movement of the clutch housing and the included clutch pulley 78 effects tightening of the belt 77, whereby the belt 77 engages the clutch pulley and causes rotation thereof in conformity with the rotation of the blower wheel assembly.

Sprocket 89, rotating with clutch pulley 78, effects, through the medium of chain 92, corresponding rotation of the sprocket 90, whereby rotation of the rear axle 60 is caused. Rotation of the rear axle 60 within the clutch springs 64 in the direction indicated by the arrows causes tightening of the clutch springs and engagement of the axle thereby in the well known manner, whereby the rear wheels 63 are engaged and driven. Rotation of the rear wheels 63 through the medium of the cleated endless belts 67 thereupon effects forward motion of the machine. Release of the operating lever 87 permits the return spring 88 to disengage the clutch mechanism. With the clutch mechanism disengaged, the machine may be propelled in a forward direction, the rear wheels 63 and the clutch springs 64 being capable of rotating freely in that direction without engaging the axle 60. As will be recognized, the clutch spring 64 function in this sense as free-wheeling units, and also permit the apparatus to be freely turned and guided at all times. The clutch mechanism described has been found to be simple and effective, although it will be apparent that any equivalent clutch mechanism may be employed, if desired.

As the machine moves forward, snow is guided into contact with the rotating blower wheel 33. The blower wheel vanes 37, rotating at high speed, function to cut or slice the snow into thin slivers or filaments. The forward inclination of the vanes 37 contributes materially to the cutting action thereof, and the V configuration thereof effects a shearing action, as will be readily understood. The particular configuration of the vanes described has been found to be highly effective, with minimum power consumption. The snow comminuted and engaged by the vanes is prevented from penetrating to the interior of the blower wheel by the baffle plate 46, and the snow is carried downwardly and rearwardly between the blower wheel vanes.

The blower wheel 33 functions in the well understood manner in which air is drawn inwardly from the sides thereof in an axial direction through the central openings 28 in the side plates of the casing, and impelled outwardly through and by the vanes thereof in all radial directions. The baffle plate 46, however, has the effect of blocking off the blower wheel at all points except adjacent the longitudinal opening 50. Air is impelled radially outwardly at high velocity through the longitudinal opening 50 by the blower wheel vanes 37, by means of which snow or other material carried between said vanes is entrained and expelled outwardly. The outward movement of the comminuted material is obviously contributed to also by centrifugal force. Exhaust opening 53 coinciding generally with the longitudinal baffle opening 50, the high velocity stream of air and entrained material is impelled into and guided upwardly by the exhaust duct 93, and thence through the intermediate section 95 and the duct elbow 97. By means of knobs 96, the intermediate section and the duct elbow may be directed to either side at any desired horizontal angle, and the effluent of the machine so controlled. The vertical direction of the fluid-material stream may also be varied by means of the sectional structure of duct elbow 97. With the outer elbow section 97" latched securely to the inner elbow section 97', the stream is directed downwardly at an angle of approximately 30° below horizontal. By unlatching the outer elbow section and allowing it to float on the hinges 99, a trajectory angle ranging up to 45° above horizontal is attained, depending on the velocity of the stream. Maximum trajectory angle is obtainable by swinging the outer elbow section 97" entirely out of the path of the stream, to the position indicated by dotted lines in Figure 3. The directional vanes 98 serve to maintain efficient flow of air and material through the duct elbow 97, and effectively prevent piling up of material therein. Material is prevented from collecting on the leading edges of the vanes by reason of their V configuration, whereby they present shear action to materials in the fluid stream. It will be evident that means other than the exhaust duct 93 and duct elbow 97 may be provided to control the air and material stream in any desired manner.

The introduction of the high speed air stream into the exhaust duct, it will be understood, has the effect of producing a low pressure area between bottom plate 22 and the blower wheel, which is effective to produce a suction effect at the leading edge of bottom plate 22. By this means material not engaged by the blower wheel vanes is entrained by suction and guided over the casing blade 54 and bottom plate 22 up into the exhaust duct 93. The inner top plate 21, it will be noted, is relatively close fitting about the outer edges of the blower wheel vanes, at least at the leading edge thereof, to effect a clean cutoff of the air and material stream, whereas the bottom plate 22 is preferably, but not necessarily, spaced therefrom, so that the aforesaid effective suction is confined in its operation to the trailing edge of the inlet opening 52. To further effect the desired sharp cutoff of the air and material stream, a sharply defined separation point between the exhaust duct and the leading edge of the inner top plate has been found to be desirable, as shown in Figure 11. It is inherent in the functioning of the apparatus, it will be noted, that the material displaced is handled one time only, and the path of material flow is continuous and smooth, without abrupt change of direction.

The apparatus may be employed to cut and remove grass by the simple expedient of adjusting the casing blade 54 to the opposite end of its travel, that is by aligning arms 56 with the lowest of the holes 58 and locking the arms in that position by means of the bolts 59, whereby the casing blade 54 is brought into close adjacency with the outer edges of the blower wheel vanes 37. As will be readily understood, the casing blade need not contact the blower wheel vanes, but may be spaced slightly therefrom. As previously described, the severed grass is carried to and entrained in the high speed air stream issuing through the baffle opening 50, and impelled thereby upwardly through the exhaust duct 93. A somewhat lower vane tip speed than that employed in the case of snow removal has been found to be adequate for entirely satisfactory grass cutting, a rotational speed of 1,200 revolutions per minute having been found suitable with a blower wheel of the dimensions previously set forth by way of example. This rotational speed results in exceedingly fine grass cuttings, which may be dispersed widespread by means of the duct elbow 97 to serve as an active fertilizing mulch, or the duct elbow may be replaced by suitable collection means connected to the exhaust duct, and the grass cuttings collected. Any air-permeable collection means may be employed, a burlap bag being entirely suitable.

The apparatus may be employed to comminute and collect leaves, by fixing the casing blade 54 in intermediate position, and operating in the previously described manner. In the case of leaves, the effectiveness of the apparatus is due to the suction action at the trailing edge of the inlet opening 52 to a greater degree than in the case of snow, said action being occasioned by the low pressure area induced above the bottom plate 22 by the high speed air stream issuing through the longitudinal baffle opening 50 and directed into the exhaust duct 93. In the utilization of the apparatus for the collection and removal of leaves, the provision of suitable air-permeable collection means on or in place of the duct elbow 97 is obviously desirable.

For use with a blower wheel of the configuration shown, a substantially similarly formed baffle opening 50 has been found to be suitable. As clearly shown in Figure 7, the baffle opening is also V-shaped and is disposed to correspond in direction to that of the blower wheel vanes.

It will be understood that the blower wheel need not be of the configuration illustrated, but may be of any other well known or desired design. The inlet opening 52 may be relatively large, as is desirable for the removal of snow, or may be of considerably smaller size when employed for other purposes. The baffle opening 50 need not be V-shaped, but may, as desired, be otherwise shaped. Reduction in size of the baffle opening, it will be understood, reduces air flow, and thereby the power consumption of the blower wheel. The area of the baffle opening may be varied as desired in accordance with the material being handled and other variables. While a baffle plate of generally cylindrical form, closely fitting within the blower wheel, is preferred, it will be recognized that the baffle plate may be of other tubular shapes.

The exhaust opening 53 preferably conforms generally to the baffle opening 50, and may be varied in shape and size therewith according to the type and volume of material being handled and the velocity required in the exhaust stream. The radial displacement between the inlet opening and the exhaust opening is in no sense critical, but may be varied up to an angle of 180° or more, in the direction of blower wheel rotation, as may be convenient. The velocity and volume of the exhaust stream may be adjustably varied, if desired, by the provision of adjustable baffles for the central openings 28 of the side plates, or by the provision of adjustable means for varying the size of the baffle opening 50. Similarly, the baffle plate 46 may be adjustably rotated with regard to the exhaust opening 53 to effect adjustable relative positioning thereof, whereby maximum efficiency under all operational conditions may be attained.

The apparatus of the present invention is not limited to the handling of snow, leaves and grass, but is adapted to be utilized effectively for diverse purposes. The invention may be employed to distribute seed or fertilizer, by the simple expedient of affixing a hopper to the inlet opening 52, to feed seed, fertilizer or other material thereinto in a controlled manner. Similarly, the machine may be employed for the collection or gathering of dispersed materials, such as seed or grain, for delivery into suitable storage or packaging facilities. The invention may be similarly employed to pick up particulate material from storage piles or bins, for delivery in a controlled manner. The apparatus of the invention is also capable of use for the comminution and controlled delivery of materials such as wood scraps. The apparatus is not limited to the use of air as a fluid impelling medium, but may operate in other fluids.

It will thus be seen, that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. Material handling apparatus comprising: a supporting frame; a cylindrical casing mounted on said frame and having an opening in at least one end thereof; a shaft fixedly mounted on said frame and extending axially of said casing; a cylindrical baffle fixedly mounted on said shaft coaxially within said casing and of less diameter than the latter, said baffle having an opening in at least one end thereof registering with said casing end opening; and a centrifugal blower wheel rotatably mounted on said shaft and having impelling vanes on the periphery thereof extending between said casing and said baffle, said casing having circumferentially spaced inlet and exhaust peripheral openings and said baffle having a peripheral opening registering with said casing exhaust opening, whereby material entering said inlet opening is comminuted by said vanes and carried thereby past said exhaust opening for entrainment in an air stream issuing through said peripheral baffle opening, said wheel, and said exhaust opening.

2. Material handling apparatus comprising: a supporting frame; a cylindrical casing mounted on said frame and having an opening in at least one end thereof; a cylindrical baffle of less diameter than said casing and having an opening in at least one end thereof; means fixedly mounting said baffle coaxially within said casing to form an annular space therebetween and with said baffle end opening registering with said casing end opening; a centrifugal blower wheel having impelling vanes on the periphery thereof, the exterior diameter of said wheel being less than the casing diameter and the interior diameter of said wheel greater than the baffle diameter; and means rotatably mounting said wheel coaxially within said casing for rotation of said vanes in said annular space, said casing having spaced inlet and exhaust peripheral openings and said baffle having a peripheral opening registering with said casing exhaust opening, whereby material entering said inlet opening is comminuted by said vanes and carried thereby past said exhaust opening for entrainment in an air stream issuing through said peripheral baffle opening, said wheel, and said exhaust opening.

3. The structure defined in claim 2 including annular end plates on said wheel of a radial thickness substantially equal to the radial distance between the baffle and the casing.

4. The structure defined in claim 2 in which the casing is spaced radially from said wheel from the trailing edge of the inlet opening to the leading edge of the exhaust opening.

5. The structure defined in claim 2 including a blade member mounted at its back edge for pivotal adjustment about a longitudinal axis parallel to the wheel axis and radially spaced from said wheel, the leading edge of the exhaust opening substantially coinciding with said blade pivotal axis and the front edge of said blade constituting the trailing edge of the inlet opening.

6. The structure defined in claim 2 in which the vanes are inclined, from the radial direction, in the direction of rotation of the wheel.

7. The structure defined in claim 2 in which the vanes are substantially V-shaped in longitudinal view.

8. The structure defined in claim 2 in which the vanes are substantially V-shaped in longitudinal view and the longitudinal edges of the baffle peripheral opening are V-shaped in conformance with the longitudinal configuration of said vanes.

9. The structure defined in claim 2 including ground-engaging rotatable means supporting the frame for movement over the surface of the ground with the wheel axis disposed horizontally, and power means on said frame for propelling the frame and driving the blower wheel.

10. The structure defined in claim 2 including rotatable ground-engaging means supporting the frame for movement over the surface of the ground with the wheel axis in horizontal position and the casing inlet opening facing in the direction of frame movement, and wall means on said frame defining a funnel-like mouth for guiding material into the casing inlet opening.

11. Material handling apparatus comprising: a supporting frame; a cylindrical casing mounted on said frame and having an opening in at least one end thereof; a cylindrical baffle of less diameter than said casing and having an opening in at least one end thereof; means fixedly mounting said baffle coaxially within said casing to form an annular space therebetween and with said baffle end opening registering with said casing end opening; a centrifugal blower wheel having a center ring, two end rings, and a plurality of circumferentially-spaced impelling vanes extending from said center ring to said end rings, said vanes being inclined, from the radial direction, in the direction of rotation of said wheel and being further inclined from said center ring to said end rings in the direction of rotation of said wheel; means rotatably mounting said wheel coaxially within said casing for rotation of said vanes in said annular space, said casing having circumferentially-spaced longitudinally-extending inlet and exhaust peripheral openings and said baffle having a longitudinal peripheral opening registering with said casing exhaust opening, the longitudinal edges of said peripheral baffle opening being V-shaped to conform to the inclination of said vanes, and said casing being spaced radially from said wheel from the trailing edge of said inlet opening to the leading edge of said exhaust opening, whereby material entering said inlet opening is comminuted by said vanes and aspirated into an air stream issuing through said peripheral baffle opening, said wheel, and said exhaust opening.

SANFORD A. SHULER, Jr.
CLARENCE E. CROFOOT.

REFERENCES CITED

The following references are of record in the file of this patent:

UNITED STATES PATENTS

| Number | Name | Date |
|---|---|---|
| 962,780 | Nelson | June 28, 1910 |
| 1,031,180 | Hancock | July 2, 1912 |
| 1,499,127 | Sherban | June 24, 1924 |
| 1,669,471 | Jones | May 15, 1928 |
| 1,899,181 | Carolus | Feb. 28, 1933 |
| 1,992,820 | Gedney | Feb. 26, 1935 |
| 2,023,608 | Nebel | Dec. 10, 1935 |
| 2,194,297 | Drumm | Mar. 19, 1940 |
| 2,198,237 | Voorderman | Apr. 23, 1940 |
| 2,224,869 | Jensen | Dec. 17, 1940 |
| 2,224,870 | Jensen | Dec. 17, 1940 |
| 2,242,922 | Poynter | May 20, 1941 |
| 2,390,421 | Cadwell | Dec. 4, 1945 |
| 2,485,713 | Dowd | Oct. 25, 1949 |